United States Patent [19]
Terajima et al.

[11] 3,994,830
[45] Nov. 30, 1976

[54] PROCESS FOR THE PRODUCTION OF ADSORBENTS OF NITROHUMIC ACID SERIES WITH AN IMPROVED ALKALI-RESISTANCE

[75] Inventors: Kazuki Terajima; Shigeru Tomita; Yoshindo Matsuda, all of Tokyo; Keiji Abe, Omiya; Kozo Higuchi, Tokyo; Keigo Iwashita, Tokyo; Nobuyuki Nishiyama; Yasuo Kato, both of Toda, all of Japan

[73] Assignees: Agency of Industrial Science & Technology, Tokyo; Hokutan Chemical Industry Co. Ltd., Toda, both of Japan

[22] Filed: Feb. 24, 1975

[21] Appl. No.: 552,362

[30] Foreign Application Priority Data
Feb. 27, 1974  Japan.............................. 49-23140

[52] U.S. Cl............................ 252/431 C; 252/426; 210/41
[51] Int. Cl.² ..................... B01D 15/00; C02B 1/14
[58] Field of Search......................... 252/426, 431 C

[56] References Cited
UNITED STATES PATENTS

| | | | |
|---|---|---|---|
| 2,029,966 | 2/1936 | Urbain et al..................... | 252/426 X |
| 3,900,422 | 8/1975 | Terajima et al..................... | 252/426 |

FOREIGN PATENTS OR APPLICATIONS

| | | | |
|---|---|---|---|
| 522,805 | 2/1958 | Canada............................... | 252/426 |

Primary Examiner—Patrick P. Garvin

[57] ABSTRACT

An adsorbent of nitrohumic acid series with an improved alkali-resistance is prepared by insolubilizing calcium nitrohumate, kneading the insolubilized product with a water-soluble polyacrylamide in the presence of water, shaping the mixture into a desired form and then subjecting it to a heat treatment followed by an acid treatment. The adsorbent thus obtained can effectively be used for removing heavy metals from an alkaline effluent without causing any deterioration of adsorptive quality and coloration of the effluent.

7 Claims, 1 Drawing Figure

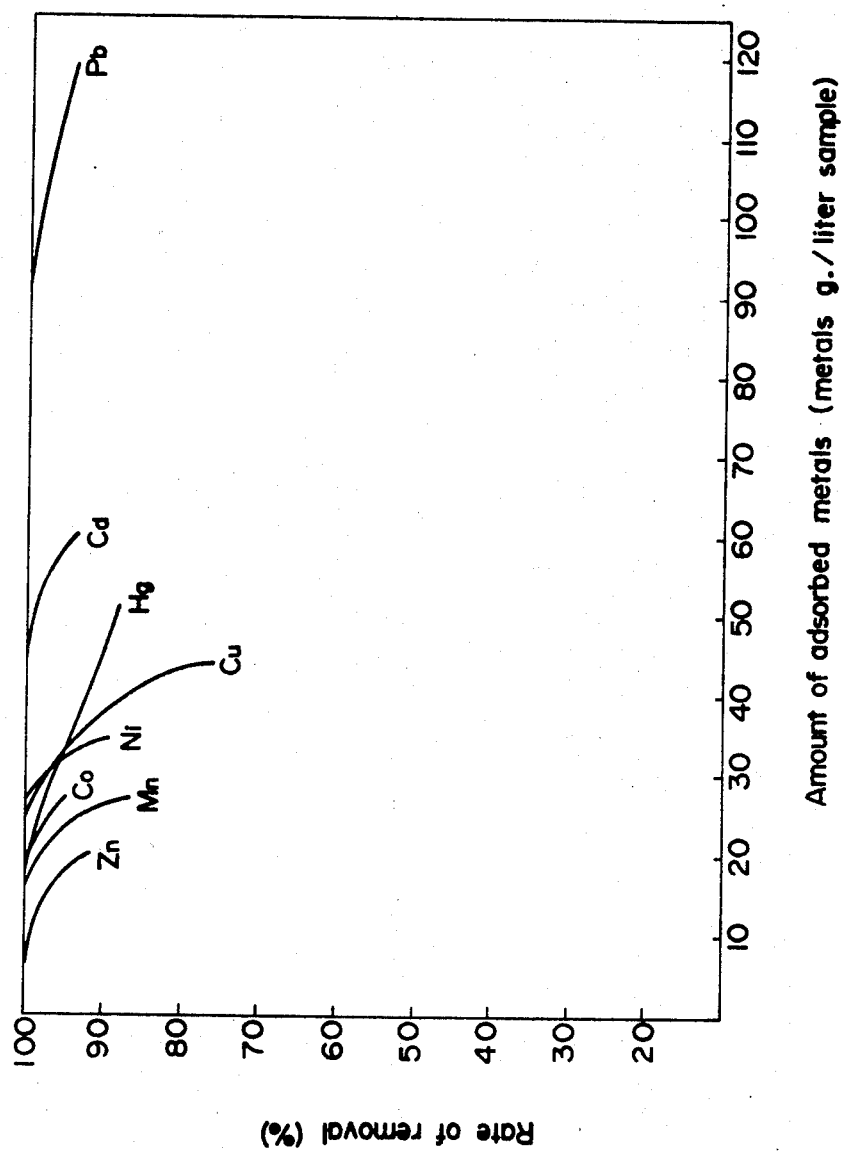

PROCESS FOR THE PRODUCTION OF ADSORBENTS OF NITROHUMIC ACID SERIES WITH AN IMPROVED ALKALI-RESISTANCE

BACKGROUND OF THE INVENTION

This invention relates to a process for the production of adsorbents of nitrohumic acid series with an improved alkali-resistance. More particularly, this invention relates to a process for the production of adsorbents of nitrohumic acid series with an improved alkali-resistance wherein calcium nitrohumate insolubilized by a heat treatment is used as active ingredient.

Nitrohumic acid produced by oxidation of lignite, brown coal and vituminous coal with nitric acid is well known and is used in a wide variety of fields such as fertilizers and deodorants. This compound is a high molecular weight substance ranging in molecular weight from a few to several ten thousands and as it possesses acidic groups such as carboxyl or phenol groups in the molecule, it has a chemical nature of capturing metal ions.

In recent years, environmental pollutions caused by mining and industrial effluents, created big problems. Among them, pollutions by metal-containing effluents are serious and present actual problems awaiting solution. We intended to utilize the aforementioned chemical nature of nitrohumic acid to remove or to recover metal ions, especially heavy metal ions, from metal-containing solutions including such effluents and have carried out researches for the practical application of nitrohumic acid.

As a result of such researches, it was found previously that an adsorbent with a strong activity to remove metal ions contained in the polluted effluents and ample practical strength to be easily regenerated and used repeatedly, can be produced by shaping into a desired form a composition comprised of sodium nitrohumate and a small amount of water-soluble polyacrylamide having a molecular weight of at least 5,000,000 and then subjecting the shaped article to a heat treatment conducted between 120° C and 160° C followed by an acid treatment [Japanese Pat. Appln. No. 32476 /Showa 48(1973)]. On the other hand, our researches revealed that the adsorbent produced in this manner has some defects; when the adsorbent is applied to alkaline effluents having a pH above 10.5, a part of nitrohumic acid is dissolved in the effluents, resulting in coloration of the treated water and gradual deterioration of its own nature. Thus, this adsorbent having a poor resistance to alkali was found still unsatisfactory for practical use. Accordingly, there is a great demand for adsorbents which can be applied without difficulty to various kinds of effluents including acidic and alkaline ones for removing therefrom heavy metals.

BRIEF SUMMARY OF THE INVENTION

It is an object of this invention to provide an adsorbent of nitrohumic acid series possessing a strong resistance to alkali.

It is another object of this invention to provide a process for the production of an adsorbent of nitrohumic acid series with an improved alkali-resistance.

It is still another object of this invention to provide an adsorbent of nitrohumic acid series wherein calcium nitrohumate subjected to a heat treatment is used as the starting material.

Other objects, features and advantages of this invention will be apparent as the description proceeds.

BRIEF DESCRIPTION OF THE DRAWING

FIG. 1 is a graph showing the relation between the amount of adsorbed metals and the rate of removal of metals in the case of passing a solution containing various kinds of metal ions through the adsorbent of this invention.

DETAILED DESCRIPTION OF THE INVENTION

As a result of many further researches made to overcome the above mentioned defects, it has now been found that these objects can easily be attained by converting nitrohumic acid into its thermally stable calcium salt, subjecting the calcium salt to a heat treatment for insolubilization and thereafter using the insolubilized material, as a starting material for producing the adsorbent. This invention has been accomplished on the basis of the above finding.

In accordance with this invention, there is provided a process for the production of an adsorbent of nitrohumic acid series with improved alkali-resistance, characterized by insolubilizing calcium nitrohumate by heating it at 250° C – 300° C, adding a small amount of water-soluble polyacrylamide having a molecular weight of at least about 5,000,000 to the resulting insoluble material, kneading the mixture in the presence of water, shaping the kneaded mixture into a desired form, and then subjecting the shaped article to a heat treatment conducted at 120° – 200° C followed by an acid treatment.

To obtain adsorbents with improved alkali-resistance according to this invention, nitrohumic acid is converted into its thermally stable calcium salt which is then subjected to a heat treatment conducted at 250° – 300° C whereby dehydration, condensation and polymerization are carried out while protecting the useful acidic groups. In this case, the time required for the heat treatment varies in relation to the treating temperature and is hard to decide definitely but is generally 0.5 – 3 hours. If the temperature for the treatment is below 250° C, alkali-resistance of the resultant product will be still insufficient. On the other hand, if the temperature exceeds 300° C, the alkali-resistance of the resultant product will be sufficient but its metal-capturing activity will considerably be lowered or useful acidic groups will partially be decomposed by heat. Hence, both extreme cases are undesirable. A heat treatment for nitrohumic acid or sodium nitrohumate does not attain the desired effects. In this case, the resulting product becomes considerably poor in adsorptivity, as the acidic groups in nitrohumic acid are labile. The desired purpose cannot be attained also in the case wherein nitrohumic acid is granulated with polyacrylamide as a binder and the resultant granules are then heated at about 250° C. The final product obtained in this case has only an extremely weak mechanical strength and so is not suited for practical use.

No particular difficulty exists in the preparation of calcium nitrohumate. The calcium salt can easily be obtained by kneading wet nitrohumic acid (containing about 40% water) with calcium hydroxide by the aid of an appropriate kneader and thereafter drying the mixture at 100° – 130° C according to usual drying methods using, for example, a rotary dryer. The lumpy product thus obtained is then pulverized and subjected in powder form to the aforementioned heat treatment for insolubilization.

In the preferred embodiment of the process of this invention, the insolubilized calcium nitrohumate used as a starting material is kneaded in the presence of water with a small amount of water-soluble polyacrylamide as a binder to form a homogeneously kneaded material which is then shaped into a desired form.

In the process of this invention, it is necessary to employ polyacrylamide having a molecular weight of at least about 5,000,000. Commercially available polyacrylamides include those having a low molecular weight of at most about 1,000,000 and those having a high molecular weight of at least about 5,000,000, of which two the low molecular ones are widely used for a general purpose. In the process of this invention, however, such low molecular weight resins cannot be employed as they fail to give the desired effect. It has been found that the use of the resin with a low molecular weight causes serious drawbacks such as considerable reduction in metal-capturing activity of the final product and many difficulties during the shaping step, while the use of polyacrylamide having a high molecular weight within the range specified above does not cause such drawbacks. Accordingly, it is important in this invention to use a water-soluble polyacrylamide with a high molecular weight of at least about 5,000,000, preferably at least about 7,000,000 for economically producing a product of good quality on a commercial scale.

There are no special limitations in the method itself for shaping the mixture of calcium nitrohumate and the polyacrylamide as far as it is possible in such method to control the shape and the size of the shaped product. For example, the mixture may be extruded in the form of a wire from an extruder and then shaped into spherical or oval granules with the aid of a disk pelletizer. Water utilizable as a medium for kneading the mixture can be used in an amount suitable for the subsequent shaping method to be adopted. Generally, an amount within the range of about 25 to 70% by weight based on the starting material is most frequently used. The water-soluble polyacrylamide may be used in a small amount and usually is used in amount of about 1 to about 10 parts by weight, preferably at most 5 parts by weight, for example, about 2 to about 4 parts by weight per 100 parts by weight of calcium nitrohumate. If the amount is too small, the product with a necessary practical strength will not be obtained. On the other hand, if the amount is too large, the content of nitrohumic acid in the product will be decreased so that the adsorptivity will significantly be deteriorated. The resin is used as small in an amount as possible.

The shaped article thus obtained is then subjected to a heat treatment conducted at 120° – 200° C whereby the water-soluble polyacrylamide used as a binder is isolubilized. In this case a vigorous heat treatment for a short period of time should preferably be avoided. Generally, the heat treatment is better carried out for about 1 – 12 hours depending upon the temperature employed within the above mentioned range. If the temperature for the heat treatment is below 120° C, effects of the treatment will be insufficient and moreover the time required for the treatment will meaninglessly be peolonged. If the temperature is too high, excessive polymerization and decomposition of the polyacrylamide will takes place, thus resulting in reduction of the strength of the product. Hence, neither of these extreme conditions should be adopted.

The shaped article subjected to the heat treatment is then treated with an acid. By this acid treatment, the acidic groups in the form of calcium salt in calcium nitrohumate are converted back to the free acid forms possessing a metal capturing activity. A hydrohalic acid such as hydrochloric acid or sulfuric acid is employed as an acid for the acid treatment. Although the use of sulfuric acid gives insoluble calcium sulfate as by-product, this insoluble compound gives no detrimental effect to the product of this invention. The use of nitric acid is inappropriate for this purpose. No special limitation exists for the means used in the acid treatment, so far as the heat-treated shaped article comes in contact fully with the acid. The contact temperature is generally maintained below about 100° C and the treatment may be carried out at room temperature. After the acid treatment, the shaped article is washed with water and, if desired, dried to prepare the desired adsorbent of nitrohumic acid series.

The product according to this invention is usually in a granular form the size of which can be determined according to the intended use. In a practical application, the granular product is charged into a tower or tank through which an effluent to be treated is passed at a reasonable rate. However, the mode of applying the adsorbent is not specifically limited and can suitably be varied in accordance with the known conventional methods for treating effluents. The adsorbent of this invention exhibits an excellent adsorptivity to various heavy metal ions and is composed of the insolubilized nitrohumic acid having an improved alkali-resistance which has been prepared by subjecting calcium nitrohumate to the heat treatment conducted under a specified condition followed by the acid treatment. Accordingly, the product of this invention can advantageously be applied as an excellent heavy metal-adsorbent for treating various mining and industrial effluents in an acidic to strongly alkaline region without causing any deterioration in the quality of the adsorbent.

As the adsorbent obtained according to the process of this invention has a high mechanical strength and is of uniform size, loss of the passing water pressure is unlikely to vary and hence the handling and control of metal-containing solutions is very easy. Further, the adsorbent can easily be regenerated by such an acid as has been used for the acid treatment and used repeatedly for the treatment of effluents. According to this invention, therefore, the adsorbent having a high mechanical strength which can withstand many repeated uses, a high metal ion-capturing activity and a low cost can be produced with good reproducibility of quality.

This invention will be explained in greater detail by way of examples.

Example 1

Nitrohumic acid having an exchange capacity for calcium of 2.44 meq/g was converted into its calcium salt by the action of calcium hydroxide and then insolubilized by heating at 250° C for 3 hours. A 6% by weight aqueous solution of a mixture of 100 parts by weight of the insolubilized material and 3 parts by weight of water-soluble polyacrylamide binder of about 8,000,000, in molecular weight was kneaded homogeneously in a kneader, extruded as a wire of 1 mm in diameter through an extruder and then shaped into spherical or ellipsoidal granules of about 1 × 1 mm in size with the aid of a disk pelletizer. The shaped article thus obtained was then subjected to a heat treatment conducted at 150° C for about 3 hours. The heat treated article was immersed in a 10% aqueous solution of hydrochloric acid for half a day at room temperature, washed with water and then dried. The exchange capacity for calcium of the resulting sample was found to be 2.14 meq/g.

One gram of the obtained sample was immersed in 1000 ml of a caustic soda solution having a pH of 10.5 or 11.0, allowed to stand overnight with occasional stirring and then filtered. When the color rating of the filtrates was measured according to "Determination of the ratings of coloration of humic acid according to the platinum-cobalt method" as normalized by the City Water Testing Methods (1970) of the Japanese Water Service Association, the rating was found to be 20 at both pH values. An average compression strength until crushing of the product thus obtained was 70 kg/cm².

Comparative Example 1

The same nitrohumic acid as the one used in Example 1 was converted with caustic soda into sodium nitrohumate. Except that the sodium nitrohumate was used directly as a starting material without being subjected to the heat treatment for insolubilization, the operation was carried out in a similar manners as described in Example 1 using the quite same conditions in concerning the species and connection with the sort and proportion of the binder used, the method of granulation, the heat treatment, the acid treatment, rinsing and drying. The exchange capacity for calcium, the color rating of the caustic soda solutions and the mechanical strength of the product are tabulated below.

Comparative Example 2

The operation was carried out in the same manner as described in Comparative Example 1 except that the shaped article was heated at 250° C. for insolubilization. Results of measurements conducted for comparison are also tabulated below.

Comparative Example 3

The operation was carried out in the same manner as described in Comparative Example 1 except that the same nitrohumic acid as the one used in Example 1 was converted with calcium hydroxide into calcium nitrohumate and used directly as starting material without any heat treatment. Results of measurements conducted for comparison are tabulated below.

Table

| | Exchang capacity for calcium (meq/g) | Color ratings of caustic soda solution pH 10.5 | pH 11.0 | Strength (Kg/cm²) |
|---|---|---|---|---|
| Example 1 | 2.14 | 20 | 20 | 70 |
| Comparative Example 1 | 2.05 | 400 | 500 | 70 |
| " 2 | 1.10 | — | — | Degraded during the operation |
| " 3 | 2.16 | 300 | 500 | 71 |

Example 2

100 Milliliters of a sample obtained in the same manner as described in Example 1 were charged into a tower of 28 mm in diameter, through which a solution containing 15 ppm of each of $Ni^{++}$, $Cu^{++}$, $Zn^{++}$, $Co^{++}$, $Pb^{++}$, $Mn^{++}$ and $Hg^{++}$ was passed at a rate of 1.5 liters/hour by means of a constant rate feeding pump. The relation between the amount of adsorbed metals (g) per liter of the sample and the rate of removal of metals (%) is shown graphically in the drawing.

What is claimed is:
1. A process for the production of an adsorbent of nitrohumic acid series with an improved alkali-resistance, characterized by insolubilizing calcium nitrohumate by heating it at a temperature of 250°–300° C, adding a water-soluble polyacrylamide having a molecular weight of at least 5,000,000 to the resulting insoluble material, the amount of said polyacrylamide being from about 1–10 parts by weight per 100 parts by weight of calcium nitrohumate, kneading the mixture in the presence of water, shaping the kneaded mixture into a desired form and then subjecting the shaped article to a heat treatment at a temperature of about 120°–200° C, followed by an acid treatment wherein the acid used is selected from the class consisting of hydrohalic acid and sulfuric acid.

2. A process according to claim 1 wherein said water-soluble polyacrylamide is used in an amount of about 2–4 parts by weight per 100 parts by weight of said calcium nitrohumate.

3. A process according to claim 1 wherein the heat treatment of said shaped form is conducted for about 1 – 12 hours.

4. A process according to claim 1 wherein the knead mixture is shaped into granules.

5. A process according to claim 1 wherein said hydrohalic acid is hydrochloric acid.

6. A process according to claim 1 wherein the insolubilizing step is carried out for about 0.5–3 hours.

7. A process according to claim 1 wherein said water-soluble polyacrylamide has a molecular weight of at least 7,000,000.

* * * * *